UNITED STATES PATENT OFFICE.

ARTHUR H. KRIEGER, OF LOS ANGELES, CALIFORNIA, ASSIGNOR TO KIESELGUHR COMPANY OF AMERICA, OF LOS ANGELES, CALIFORNIA, A CORPORATION OF CALIFORNIA.

COMPOSITION FOR BUILDING MATERIALS AND PROCESS OF MAKING THE SAME.

1,184,184.     Specification of Letters Patent.     Patented May 23, 1916.

No Drawing.     Application filed March 2, 1914. Serial No. 822,003.

*To all whom it may concern:*

Be it known that I, ARTHUR H. KRIEGER, a citizen of the United States, residing at Los Angeles, in the county of Los Angeles, State of California, have invented a new and useful Composition for Building Materials and Process of Making the Same, of which the following is a specification.

This invention relates to a composition for floor slabs, wall blocks or other structural purposes, and the main object of the invention is to produce an article of this kind which is extremely light and presents sufficient strength for structural purposes, and is an effective insulator for heat and sound.

In order to provide a light composition, I use, as the main ingredient, kieselguhr or diatomaceous, or infusorial earth, and as this material is relatively weak in its natural state, I calcine the same sufficiently to impart to it the requisite cohesive strength, the calcined product being then crushed to suitable condition for use as a filler in the composition. Any suitable binder may be used in connection with this filler, but I prefer plaster of Paris.

The composition is preferably made as follows: The kieselguhr, either in its natural state, or dried, is calcined preferably above a red heat until the required strength is obtained, the temperature being sufficient to cause partial fritting or incipient fusion of the kieselguhr, with resultant increase in strength and density and some decrease in its porosity. The material is then crushed to approximately 4 mesh and finer and mixed with preferably 30 pounds of plaster to 100 pounds of kieselguhr taken and with sufficient water to give the proper consistency for casting into molded shapes. The composition while still plastic is then molded or poured into suitable forms or molds, and when it has set it is withdrawn from such molds.

The proportions of binder used may be varied, for example, from 15 to 50 per cent. of the amount of kieselguhr.

What I claim is:

1. A composition for structural materials, consisting of fragments of kieselguhr in a partially fritted condition, and a binder.

2. A composition for structural materials, consisting of fragments of kieselguhr and a binder, each fragment of kieselguhr being partially fritted to increase its strength.

3. A composition for structural materials, consisting of fragments of kieselguhr in a partially fritted condition, and a binder composed of plaster of Paris.

4. The process of making a composition block or slab for structural purposes, which consists in calcining kieselguhr at a sufficient temperature to increase its strength, crushing the calcined product to fragmentary condition, mixing the fragments with a binder and water and molding to shape.

5. The process of making a composition molded body for structural purposes, which consists in calcining kieselguhr at a sufficient temperature to increase its strength, crushing the calcined product to fragmentary condition, mixing the fragments with plaster of Paris and water and molding to shape.

ARTHUR H. KRIEGER.

Witnesses:
   W. DIETERLE,
   ARTH. MELTZER.